Patented Nov. 6, 1951

2,574,256

UNITED STATES PATENT OFFICE 2,574,256

METHOD OF RECOVERING CRYSTALLINE CYANOACETIC ACID

Alvin C. Flisik, Stony Point, and Leonard Nicholl, Nyack, N. Y.

No Drawing. Application October 27, 1949, Serial No. 123,978

10 Claims. (Cl. 260—465.4)

This invention relates to an improved method for recovering pure, crystalline, cyanoacetic acid, of low-color, by extractive distillation with steam from solvent extracts of cyanoacetic acid derived from inorganic salt solutions.

In Patent No. 2,480,380, issued August 30, 1949, for Recovery of Cyanoacetic Acid From Aqueous Inorganic Salt Solutions, there is disclosed and claimed a novel process for recovering cyanoacetic acid from aqueous brine; which comprised essentially passing an acid-containing brine solution countercurrent to a stream of an extractant, comprising methyl isobutyl ketone, to form a salt-free extract layer of cyanoacetic acid, water and methyl isobutyl ketone, and a water layer containing the salt with traces of the acid and solvent. The salt-free extract layer is concentrated by distilling off the water as an azeotrope with the methyl isobutyl ketone, whereby all the water present in the extract is removed, the cyanoacetic acid being recovered from the residual, water-free solvent solution, by vacuum distillation of the ketone, the residual cyanoacetic acid being allowed to solidify. The resultant cyanoacetic acid assayed 92–94% cyanoacetic acid. The above process, while affording appreciable advantages over prior art processes, particularly as to the expeditious and practical removal of water from a hydrolyzable compound, has certain disadvantages when carried out on an industrial scale. These operative difficulties may be summarized as follows:

1. There is an unavoidably large loss of methyl isobutyl ketone, especially during its removal from the extract by vacuum distillation, due to the comparatively high vapor pressure of methyl isobutyl ketone at moderate temperatures.

2. The cyanoacetic acid recovered is dark brown in color, and of an unsatisfactory crystalline form. The dark color of the product is due to the solubility, in the methyl isobutyl ketone, of certain highly-colored impurities and by-products of the reaction, which are taken up by the ketone extract, from the aqueous inorganic salt solution, along with the cyanoacetic acid, and are carried with it up to the final concentration.

3. Plant operational difficulties occur in the handling of molten acid, in the last stage of the procedure, due to the fact that the final molten mass of cyanoacetic acid must be maintained at a temperature above 64° C., otherwise it would solidify to form a solid mass, and that must be poured into containers in molten form. In addition, there is a disadvantage, in that the consumer is faced with the problem of removing a completely solidified mass from its shipping container.

4. The product recovered assays about 92–94% cyanoacetic acid, due to the fact that enough impurities are taken up by the methyl isobutyl ketone to lower the purity of the final product.

It has now been found that the difficulties above enumerated can be essentially overcome by the improvements herein, which involve the formation of an aqueous solution of cyanoacetic acid, concentrating the solution, and then crystallizing substantially pure cyanoacetic acid from this concentrated aqueous solution. By so doing, water will be the distillate, instead of methyl isobutyl ketone, in the concentration of the cyanoacetic acid solution, and it does not matter if some water is lost in the vacuum treatment, whereas the losses of methyl isobutyl ketone are appreciable and costly. To purify the product, it has been found that a preliminary decolorization of the original brine with activated carbon, before extraction of the cyanoacetic acid, is very desirable.

To effect the solution of cyanoacetic acid in water, extractive distillation is used. In this improved treatment, an aqueous methyl isobutyl ketone extract of cyanoacetic acid, or a substantially anhydrous methyl isobutyl ketone extract of cyanoacetic acid, as prepared according to the above-identified patent, and without vacuum distillation of the methyl isobutyl ketone, is steam-distilled to remove the ketone from the extract, as a binary azeotrope with water, leaving the cyanoacetic acid dissolved in water derived from the steam. This aqueous cyanoactic acid solution is concentrated and the acid recovered by crystallization.

It is, therefore, among the features of novelty and advantage of the present invention to provide an improved extractive distillation process for the recovery of anhydrous cyanoacetic acid from solutions thereof in pure or aqueous aliphatic ketones, leaving the cyanoactic acid in ketone-free aqueous solution, which is concentrated, and the acid recovered by crystallization. Other features of novelty and advantage include the preparation and recovery of low color, anhydrous crystalline cyanoacetic acid from an aqueous solution of cyanoacetic acid. Additional features of novelty and advantage include the elimination of high vacuum treatment for the recovery of solvents, and the substitution of water, derived from steam in an extractive distillation, as a solvent for the cyanoactic acid, the resulting aqueous solution being concentrated to provide a mother liquor, from which the cyanoacetic acid is crystallized by seeding and simple evaporation of the water.

The above and other desirable features of novelty and advantage of the present invention will be more clearly appreciated from the following general description of the process, and of a specific plant run:

In carrying out the improvements of the present invention, an aqueous methyl isobutyl ketone extract of cyanoacetic acid, or the anhydrous methyl isobutyl ketone extract of cyanoacetic acid, obtained in the manner described in Patent No. 2,480,380, and containing approximately 18% cyanoacetic acid, is steam-distilled to remove the methyl isobutyl ketone from the extract. The temperature of the distilland during the steam distillation will be automatically maintained at the equilibrium temperature of about 88°, of the constant boiling mixture of methyl isobutyl ketone and water. The proportion of water used for the steam distillation is so regulated that when all the ketone has been removed, approximately a 40% aqueous solution of cyanoacetic acid remains. The concentration of the acid, at this stage, is limited in order to avoid excessive decomposition during the steam distillation operation. The resulting aqueous solution of the acid is then concentrated, under a 28-29 inch vacuum, to a concentration of 90-93%. This concentrated solution is then cooled to 55°, seeded with a few crystals of cyanoacetic acid, and then cooled slowly, over an eight-hour period, down to approximately 25° C. The crystals obtained are practically white, and when crystallization has been carried out correctly, have the appearance of sugar. There is obtained approximately 50% of the available cyanoacetic acid as a 98-100% pure crystallization product, which can be readily packaged, as such, without involving previous difficulties of melting, with accompanying undesired decomposition, and the difficulty of removing a solid mass from a container is completely avoided by the free flowing crystalline product.

A specific example of a plant run is as follows:

3,780 lbs. of an 18% cyanoacetic acid-methyl isobutyl ketone extract, prepared according to our prior patent, above identified, after carbon treating the brine solution of cyanoacetic acid, was steam distilled to remove the methyl isobutyl ketone, and the distillation carried out in such a way that a 40% aqueous solution of the cyanoacetic acid remained after all the ketone had been removed. This aqueous solution of cyanoacetic acid was then concentrated, under a 28-29 inch vacuum, and a maximum liquid temperature of 68-70° C., until an approximately 90% aqueous solution of cyanoacetic acid was obtained. The resulting concentrated solution was cooled to 55° C., seeded with some crystals of cyanoacetic acid, and then cooled, uniformly, over an eight-hour period, to 25° C., in order to grow the desired form of crystals. The crystals obtained may be separated from the mother liquor by filtration or centrifugation. A yield of 386 lbs. of 98-100% cyanoacetic acid was obtained, amounting to approximately 57.5% of the available acid in the extract. Additionally, 414 lbs. of mother liquor was recovered, assaying 68.5% total acid as cyanoacetic acid, and 66.8% cyanoacetic acid by hydrolysis. An overall yield of over 90% of the available acid in the original extract was thus realized. By concentration of the cyanoacetic acid in the mother liquor to approximately 90%, another 120 lbs. of cyanoacetic crystals, assaying 98-100% cyanoacetic acid may be obtained.

It will now be appreciated that there has been provided a novel process, of unexpected efficiency, for the production of crystalline cyanoacetic acid, containing 98-100% available cyanoacetic acid, by the steam distillation of an aliphatic ketone extract of cyanoacetic acid, to remove the ketone and give an aqueous solution of cyanoacetic acid, which is then concentrated, and from which the acid is separated out as a crystalline product of low color which can be packaged and handled without difficulty.

What is claimed is:

1. Method of purifying a mixture of cyanoacetic acid, aliphatic ketone and contaminants comprising ketone-soluble, highly colored impurities and by-products of reaction, which mixture is derived by treating aqueous brine solutions of cyanoacetic acid with selectively hydrophilic aliphatic ketones whereby to form a substantially anhydrous ketone solution containing said cyanoacetic acid, and contaminants, which comprises steam distilling the mixture and removing the ketone from the mixture as an aqueous azeotrope.

2. Method of purifying a mixture of cyanoacetic acid, aliphatic ketone and contaminants comprising ketone-soluble, highly colored impurities and by-products of reaction, which mixture is derived by treating aqueous brine solutions of cyanoacetic acid with selectively hydrophilic aliphatic ketones whereby to form a substantially anhydrous ketone solution containing said cyanoacetic acid, and contaminants, which comprises steam distilling the mixture to remove the ketone from the mixture as an aqueous azeotrope, and recovering an aqueous cyanoacetic acid solution.

3. Process in accordance with claim 2, in which the recovered aqueous cyanoacetic acid solution is treated to separate the acid as a substantially anhydrous and color-free, crystalline product.

4. A method of treating a mixture containing cyanoacetic acid, methyl isobutyl ketone and color bodies derived by treating aqueous brine solutions of cyanoacetic acid with methyl isobutyl ketone, whereby to form an aqueous ketone solution containing said cyanoacetic acid, and contaminants, which comprises steam distilling the mixture whereby to remove the ketone from the mixture as an aqueous azeotrope.

5. The method of recovering cyanoacetic acid from a methyl isobutyl ketone solution thereof, comprising the steps of steam distilling the acid solution to remove the ketone, whereby an aqueous solution of the cyanoacetic acid, dissolved in water derived from the steam distillation, is formed, concentrating the so-formed aqueous solution of cyanoacetic acid, and crystallizing the acid from the resulting concentrated solution.

6. Method according to claim 5, including seeding the concentrated acid solution with cyanoacetic acid crystals, and slowly cooling the concentrate.

7. The method of recovering cyanoacetic acid from a methyl isobutyl ketone solution thereof, comprising the steps of steam distilling the methyl isobutyl ketone solution of cyanoacetic acid to remove the ketone, whereby an aqueous solution of the cyanoacetic acid, dissolved in water derived from the steam distillation, is formed, concentrating the so-formed aqueous solution of acid, crystallizing the cyanoacetic acid from the resulting concentrated solution, and separating the acid from the mother liquor.

8. The method of preparing crystalline cyanoacetic acid, comprising treating an aqueous brine solution of cyanoacetic acid, color bodies and byproducts of reaction with decolorizing carbon, whereby to remove the color bodies, extracting the decolorized brine with methyl isobutyl ketone to form a methyl isobutyl ketone extract of cyanoacetic acid containing approximately 18% cyanoacetic acid, steam distilling the ketone from the extract, whereby the ketone is removed as an aqueous azeotrope, and an approximately 40% aqueous solution of cyanoacetic acid is formed, by maintaining the temperature of the vapor at about 88° C. (equilibrium temperature of the methyl isobutyl ketone-water azeotrope), concentrating the aqueous solution of cyanoacetic acid, under a 28-29 inch vacuum, to an acid content of 90-93%; cooling the concentrated aqueous solution to 55° C., seeding the concentrated solution with a few crystals of cyanoacetic acid, then cooling slowly over an eight-hour period, to approximately 25° C.; and separating the resulting white crystals of 98-100% cyanoacetic acid from the mother liquor.

9. The method of recovering anhydrous, crystalline cyanoacetic acid from an aqueous methyl isobutyl ketone extract of cyanoacetic acid, containing approximately 18% cyanoactic acid, comprising steam distilling the ketone from the extract, the distillation being so conducted that an approximately 40% solution of cyanoacetic acid in water is formed, maintaining the vapor temperature at about 88° C. (equilibrium temperature of methyl isobutyl ketone-water azeotrope), concentrating the aqueous solution of acid, under a 28-29 inch vacuum, to an acid content of 90-93%; cooling the concentrated acid solution to 55° C., seeding the concentrated solution with a few crystals of cyanoacetic acid, then cooling slowly to approximately 25° C., over an eight-hour period; separating the resulting white crystals of 98-100% cyanoacetic acid from the mother liquor; reconcentrating the cyanoacetic acid in the mother liquor to approximately 90%, recrystallizing, and separating the resulting crystals from the mother liquor.

10. Process of preparing colorless, anhydrous, crystalline cyanoacetic acid, comprising the steps of forming an aqueous inorganic salt solution containing 17-25% cyanoacetic acid, treating the salt solution with a decolorizing agent to remove color bodies, extracting said decolorized solution with an excess of methyl isobutyl ketone to form a salt-free extract layer comprising a solution of cyanoacetic acid, water, methyl isobutyl ketone, and contaminants comprising ketone-soluble byproducts of reaction, and a water-rich layer containing substantially all the salt with traces of cyanoacetic acid and methyl isobutyl ketone, then steam distilling the said salt-free extract layer to remove the ketone as an aqueous distillate, recovering an aqueous solution of the cyanoacetic acid as a distilland, evaporating water from the distilland to produce a concentrated aqueous solution of the cyanoacetic acid, and then crystallizing the acid by seeding the said solution, and slowly cooling the concentrate.

ALVIN C. FLISIK.
LEONARD NICHOLL.

REFERENCES CITED

The following references are of record in the file of this patent:

UNITED STATES PATENTS

| Number | Name | Date |
|---|---|---|
| 2,338,834 | Britton et al. | Jan. 11, 1944 |
| 2,480,380 | Nicholl et al. | Aug. 30, 1949 |

OTHER REFERENCES

Young, "Distillation Principles and Proc." (Macmillan) p. 443, (1922).

Gatterman, "Practical Methods of Org. Chem." (Macmillan, 3d ed.) pp. 1-14 (1923).

Miwia, Chem. Abstracts, vol. 22, p. 3268 (1928).